(12) United States Patent
Hong et al.

(10) Patent No.: US 12,030,508 B2
(45) Date of Patent: Jul. 9, 2024

(54) SCENARIO DISCRIMINATIVE HYBRID MOTION CONTROL FOR MOBILE ROBOTS

(71) Applicant: Ford Global Technologies, LLC, Dearborn, MI (US)

(72) Inventors: Sanghyun Hong, Ann Arbor, MI (US); Jianbo Lu, Northvile, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 573 days.

(21) Appl. No.: 17/320,134

(22) Filed: May 13, 2021

(65) Prior Publication Data
US 2022/0363273 A1    Nov. 17, 2022

(51) Int. Cl.
| B60W 50/00 | (2006.01) |
| B66F 9/06 | (2006.01) |
| G01S 17/89 | (2020.01) |
| G05B 11/36 | (2006.01) |
| G05B 13/04 | (2006.01) |

(Continued)

(52) U.S. Cl.
CPC ......... *B60W 50/0098* (2013.01); *B66F 9/063* (2013.01); *G01S 17/89* (2013.01); *G05B 11/36* (2013.01); *G05B 13/048* (2013.01); *G05D 1/0212* (2013.01); *G05D 1/0248* (2013.01); *B60W 2050/0011* (2013.01)

(58) Field of Classification Search
CPC ....... B60W 50/0098; B60W 2050/0011; B66F 9/063; G01S 17/89; G01S 17/08; G01S 17/931; G05B 11/36; G05B 13/048; G05D 1/0212; G05D 1/0248; G05D 1/0088; G05D 2201/0211; B25J 5/007; B25J 9/161; B25J 9/1664
See application file for complete search history.

(56) References Cited

U.S. PATENT DOCUMENTS

| 9,885,773 B2 | 2/2018 | Hehn et al. |
| 2018/0052466 A1 * | 2/2018 | Wu ........................ G01S 7/4808 |

(Continued)

FOREIGN PATENT DOCUMENTS

| CA | 3076498 A1 * | 3/2019 | ............ B60W 30/08 |
| WO | WO-2017129200 A1 * | 8/2017 | |

(Continued)

OTHER PUBLICATIONS

Dorea et al. "Stochastic Nonlinear Model Predictive Mobile Robot Motion Control" (Nov. 2018).

*Primary Examiner* — Rachid Bendidi
(74) *Attorney, Agent, or Firm* — Emily Drake; Eversheds Sutherland (US) LLP

(57) ABSTRACT

Scenario discriminative hybrid motion control for robots and methods of use are disclosed herein. A method may include determining a number of objects in a space, determining when a goal is within the space, and selectively switching between a plurality of control schemes based on the number of objects in the space and whether the goal is within the space. The plurality of control schemes including a model predictive control scheme, a simplified model predictive control scheme, and a proportional-integral-derivative scheme. Selectively switching between the plurality of control schemes reduces power consumption of an automated system compared to when the automated system utilizes only the model predictive control scheme.

2 Claims, 3 Drawing Sheets

(51) Int. Cl.
  *G05D 1/00*   (2006.01)
  *G05D 1/02*   (2020.01)

(56) References Cited

U.S. PATENT DOCUMENTS

2019/0235512 A1* 8/2019 Sinyavskiy .......... G05D 1/0217
2019/0258251 A1  8/2019 Ditty et al.

FOREIGN PATENT DOCUMENTS

WO    2020030966 A1   2/2020
WO    2020197800 A1   10/2020

* cited by examiner

SCENARIO DISCRIMINATIVE HYBRID MOTION CONTROL FOR MOBILE ROBOTS

BACKGROUND

The delivery and moving of goods continues to increase due to online shopping. To meet this demand, many companies are developing autonomous systems, including self-driving vehicles and delivery bots for delivery good.

The autonomous navigation software stack in an autonomous system (AS) consumes a substantial amount of electrical energy. For example, motion control software used for autonomous navigation in robots or autonomous vehicles may apply a predictive control framework, such as Model Predictive Control (MPC), that predicts future trajectories and finds a control command generating an optimal trajectory. While the MPC framework is beneficial in dealing with collision-free motion control in a dynamic environment, it is very computationally expensive.

BRIEF DESCRIPTION OF THE DRAWINGS

The detailed description is set forth regarding the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

The present disclosure is directed to systems and methods to provide scenario discriminative hybrid motion control for robots or other autonomous systems to navigate to an end goal (i.e., location). In particular, the present disclosure is directed to hybrid motion control systems and methods that utilize different control schemes (e.g., MPC, simplified MPC, and conventional proportional-integral-derivative (PID) control) and switch between the control schemes for autonomous navigation and movement depending on the operation scenarios for energy efficiency.

In some instances, an example hybrid motion control system for controlling mobile robots utilizes different kinds of control schemes (e.g., Model Predictive Control (MPC), simplified MPC, and conventional (PID) control) and switches among those control schemes depending on operation scenarios for energy efficiency. An MPC scheme can predict, future trajectories and finds a control command generating an optimal trajectory and is beneficial in dealing with collision-free motion control in a dynamic environment. Simplified MPC approaches assume a constant velocity during trajectory prediction and search, for discrete control space instead of continuous control space. However, those simplified MPC approaches show limited performance in some special cases (e.g., precisely reaching a goal and maneuvering near a goal).

The hybrid motion control system can be deployed in an example mobile robot, referred to as an autonomous system (AS). The AS can comprise four wheels and can be may be instrumented with laser imaging, and ranging (LIDAR) sensors which are used for detecting obstacles around mobile robots, running localization, path planning, perception (e.g., object detection and leg tracking), and motion control algorithms—just to name a few. The signals from the LIDARs may be fed into localization and perception algorithms and may also be used to determine if a space in front of the AS is open. The AS localizes itself to determine the distance to a goal. While specific configurations of autonomous systems may be disclosed herein, the present disclosure is not intended to be limited to any specific configuration of an AS.

As noted above, the autonomous navigation software stack in an AS consumes a substantial amount of electrical energy. An example battery-powered AS of the present disclosure may implement an efficient software architecture for navigation to conserve energy.

Illustrative Embodiments

Figure 1:
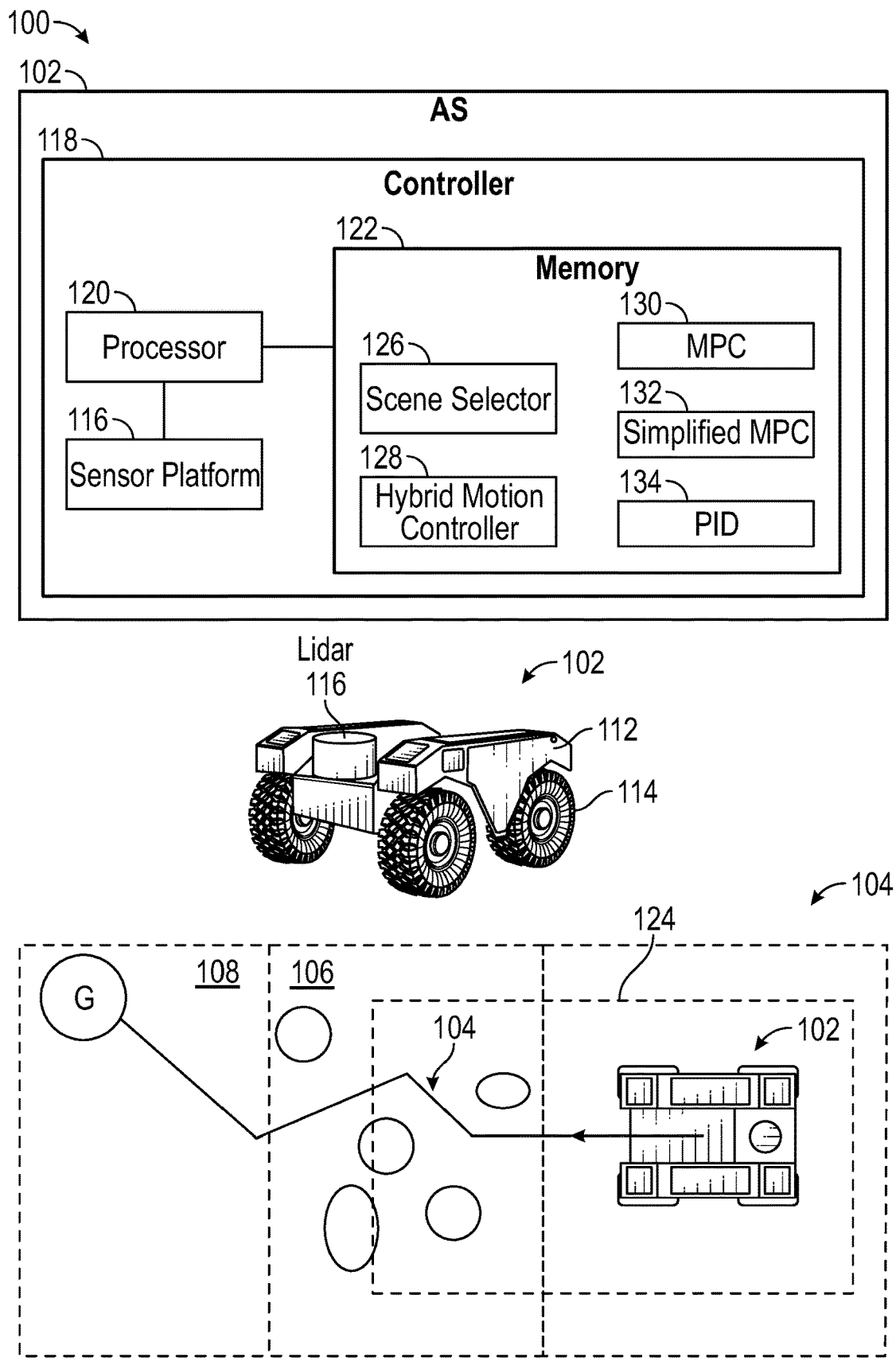
FIG. 1 illustrates an example architecture where the systems and method of the present disclosure may be practiced.

Turning now to the drawings, FIG. 1 depicts an, illustrative architecture 100 in which techniques and structures of the present disclosure may be implemented. The architecture 100 includes an AS 102 that is within an operating environment 104. The operating environment 104 may include areas 106 and 108. The area 106 is densely packed with objects/obstacles, whereas the area 108 includes no objects/obstacles. The AS 102 may create navigation route through or path 110 to a goal G through each of the areas 106 and 108. The portion of the path 110 extending through area 106 may require more complicated or nuanced navigation than that used by the AS 102 to navigate through area 108.

In one example, the AS 102 comprises a frame 112 having four wheels, such as wheel 114. The AS 102 also can include a sensor platform 116 that can include, for example one or more LIDAR sensors and/or cameras. The AS 102 can comprise a controller 118 that includes a processor 120 and memory 122. The processor 120 executes instructions stored in memory 122 to, provide any of the functions disclosed herein. When referring to functions performed by the controller 118, it will be understood that this includes execution of instructions stored in memory 122 by the processor 120. In some instances, the memory 122 is configured with modules of a control system framework as will be discussed in greater detail infra.

Output from the LIDAR sensors can be used by the controller 118 to detect obstacles around the AS 102, and are utilized for localization, path planning, perception (e.g., object detection and leg tracking), and motion control algorithms. The signals from the sensor platform 116 may be fed into localization and perception algorithms implemented by the controller 118 and may also be used to determine when a space 124 in front of the AS 102 is open/unoccupied. To be sure, the size and configuration of the space 124 can vary according to design requirements and/or operating parameters. In some instances, the controller can utilize the output of the sensor platform 116 to localize itself to determine a distance to the goal G.

The framework of the control system may include a scenario selector module 126 and a hybrid motion controller module 128. The scenario selector module 126 can be executed to determine a scenario that a mobile robot is currently operating within. The hybrid motion controller module 128 may switch to an appropriate motion control scheme depending on the scenario determined to prevent unnecessary consumption of battery power. In some instances, the hybrid motion controller module 128 can switch between a plurality of motion control schemes such as MPC 130, simplified MPC 132, and PID 134.

The MPC 130 represents a standard MPC controller using an optimization solver to find an optimal command in the continuous control space (e.g., space 124). This yields the best motion performance, but may require the most computational efforts and energy consumption. The simplified MPC 132 represent a MPC controller that assumes a constant velocity during trajectory prediction and search for discrete control space for an optimal command. This control scheme may result in degraded motion performance compared to the standard MPC and may not achieve motion objectives in some special cases, but it can reduce computational efforts. PID 134 represents an upfront motion controller to create motion commands based on the position and orientation errors with respect to a goal along with predefined control gain values. The PID 134 provides the most energy efficient control scheme.

Utilizing data from perception algorithms (e.g., human/object detection and leg tracking) and the output of the sensor platform 116 (e.g., LIDAR and camera), the controller 118 can determine in what kind of scenario the AS 102 currently operates. For example, based on the number of detected objects, the controller 118 can determine if the space 124 is crowded (e.g., is not a direct, unobstructed route to the goal G). For example, the controller 118 can detect the objects in area 106. That is, the objects in the area 106 are currently within the space 124 that the controller 118 is evaluating. The determination as to whether the space 124 is crowded can be related to a number of objects in the space 124. The controller 118 determines that numerous objects are present and selects the MPC 130 to create a portion of the path 110 that allows the AS 102 to navigate through the area 106 and around the objects therein.

Thus, if the environment is crowded requiring accurate trajectory prediction (could include additional objects in the operating environment than those shown), the controller 118 can select the MPC 130 to implement standard MPC motion control. For example, the AS 102 may need to weave in and out of objects in order to arrive at the goal G and deliver the package.

The controller 118 can measure time taken for control command computation when traveling through the area 106, the controller 118 may determine when real-time computational overruns are occurring. If real-time overrun occurs due to, heavy computation, the simplified MPC 132 may be used to ensure real-time running with a bit potential degradation of motion performance.

As the AS 102 enters area 108, the controller 118 may determines that the space 124 is open around the AS 102, and the goal G is detected inside the operating environment 104. When these conditions are present the PID 134 may be selected by the controller 118. When using the PID 134, the controller 118 need not waste battery power by running advanced control technique for a straightforward control scenario. In this example, a direct and unobstructed route exists between the AS 102 the goal G. In sum, by switching among the three control techniques, battery power consumed for command computations may be conserved while achieving desired motion performance in real-time operation.

Figure 2:
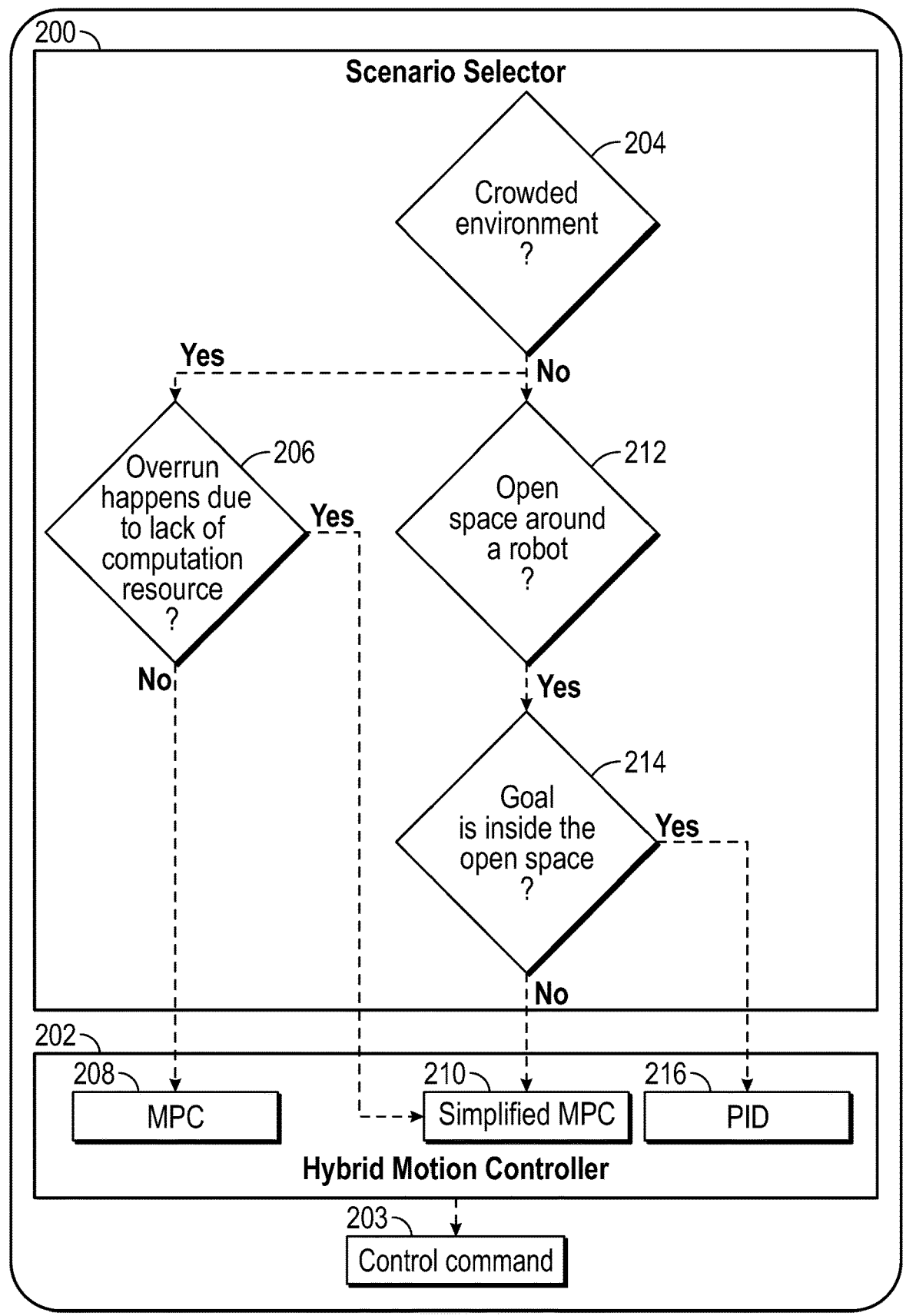
FIG. 2 illustrates a flowchart, of scenario selection logic and a schematic diagram of an example hybrid motion controller.

Referring now to FIG. 2, which includes example scenario selection logic flow 200 and a schematic diagram of an example hybrid motion controller 202. The scenario selection logic flow 200 and hybrid motion controller 202 are utilized to determine control commands 203 used to navigate an AS. The scenario selection logic flow 200 can be implemented as instructions executed by the controller described above. The scenario selection logic flow 200 includes a step 204 of determining if the AS is in a crowded environment. As noted above, this can include obtaining LIDAR and/or camera output from a sensor platform within a space surrounding the AS (or forwardly in an area or direction in which the AS is to navigate through). Again, while LIDAR has been discussed, any sensors capable of determining object presence and/or distance from the AS (can be utilized in accordance with the present disclosure.

If a number of objects in this space are above a threshold (or other criteria are met that would indicate crowdedness), the space is determined to be crowded. The method can include a step 206 of determining if computing overrun is occurring in the AS. The crowdedness of a space may be related to how densely packed the space is with objects. In another example, crowdedness could be a combination of a narrowness of the space and/or the presence of objects/obstacles in the space.

It will be understood that this can be caused by a lack of compute resources or computational complexity with respect to objects detected in the space. For example, numerous objects moving rapid in the space may result in complex analyses and computational overrun. When computational overrun is not present, a model predictive control, module (MPC) 208 can be selected by the hybrid motion controller 202. When computational overrun is detected, the hybrid motion controller 202 can select a simplified MPC 210 for navigation and motion control.

When the space around the AS is determined not to be crowded in step 204, the method can include a step of determining if open space is available around the AS in step 212. Again, this can be based on analysis of sensor platform data such as LIDAR and camera output. If open space is determined, the method can include a step 214 of determining if the goal for the AS is located in the open space. If the goal is not in the open space, the hybrid motion controller 202 can select to use the simplified MPC 210 for navigation and motion control PID module 216 is selected by the hybrid motion controller 202 when the goal is located in the open space. Again, the MPC requires the most computational overhead, the simplified MPC requires less, computational overhead than the MPC, and the PID requires the least. Correspondingly, MPC requires the most power consumption, the simplified MPC requires less power consumption than the MPC, and the PID requires the least amount of power consumption.

Figure 3:
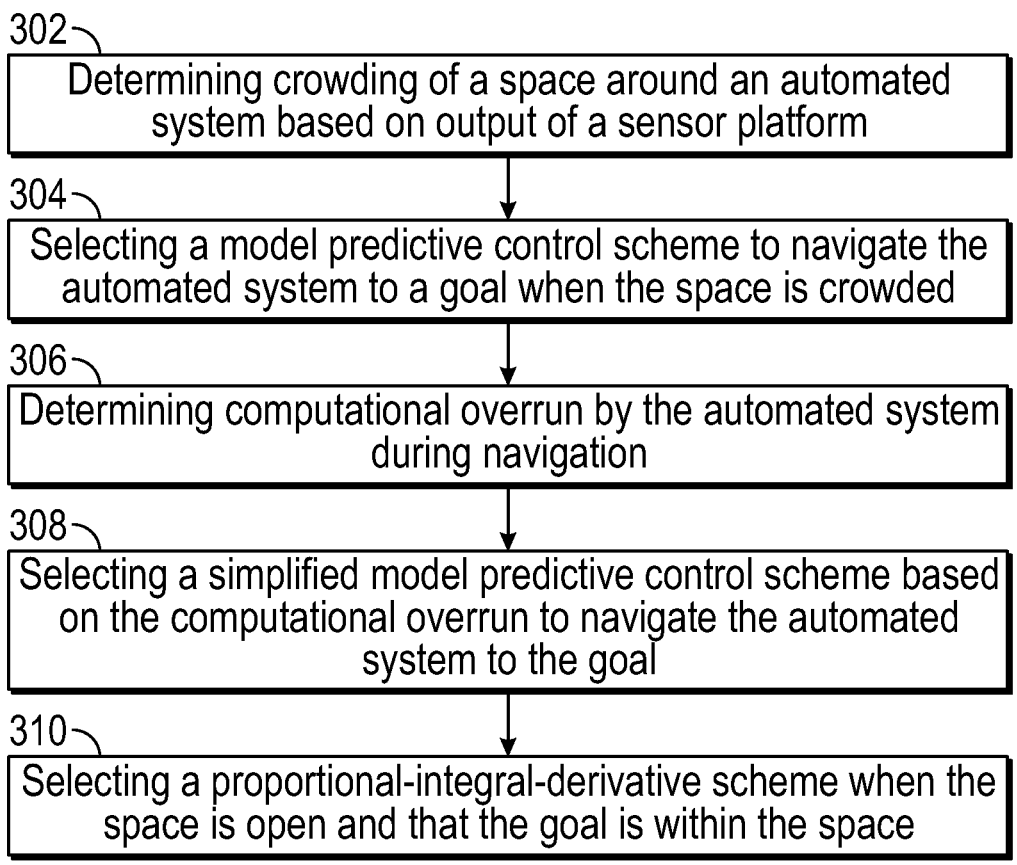
FIG. 3 is a flowchart of an example method of the present disclosure.

FIG. 3 is a flowchart of an example method of the present disclosure. The method can include a step 302 of determining crowding of a space around an automated system based on output of a sensor platform. As noted above, this can include determining a count or density of objects occupying a space around the AS from sensor output such as LIDAR output.

The method can also include a step 304 of selecting a model predictive control scheme to navigate the automated system to a goal when the space is crowded. In one example, if the AS determines that a straight line of travel is not available through the space around the AS (e.g., the AS will have to navigate around objects), a controller of the AS may select a model predictive control scheme in order to determine a path through the space and around the objects.

The method can also include a step 306 of determining computational overrun by the automated system during navigation. For example, when using the model predictive control scheme, the controller of the AS may experience computational overrun. In one example, the number of objects in the space around the AS that are navigated through may be so numerous that the path is overly complex. When overrun is determined, the method can include as step 308 of selecting a simplified model predictive control scheme based on the computational overrun to navigate the automated system to the goal. The method can further include a step 310 of selecting a proportional-integral-derivative scheme when the space is open and that the goal is within the space.

In some instances, the controller can switch back to the model predictive control scheme when the computational overrun is no longer detected. The controller can actively switch between the MPC, simplified MPC, and PID schemes on-the-fly based on the crowdedness of the space and/or whether computational overrun is being experienced by the AS. In some instances, the scheme selected may be based, in part, on whether the goal for the AS is in the space or not.

As noted above, the controller can obtain output from a sensor platform Again, the sensor platform comprises any one or more of a laser imaging and ranging sensor or a camera. Other sensors for detecting the presence and/or distance between the AS and objects can be used.

Figure 4:
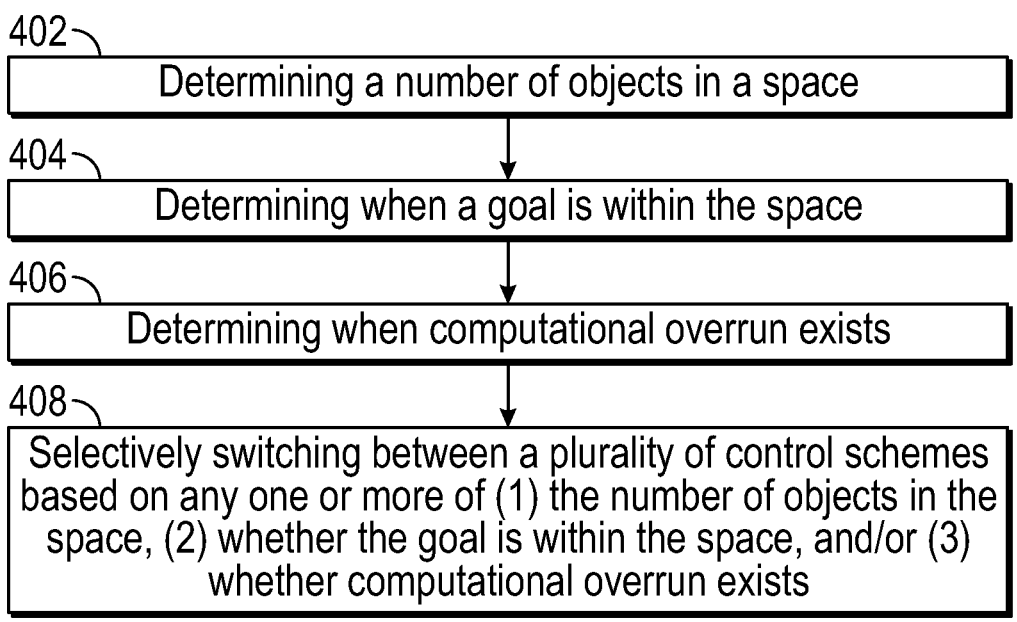
FIG. 4 is a flowchart of another example method of the present disclosure.

FIG. 4 is a flowchart of another example method. The method can include a step 402 determining a number of objects in a space, as well as a step 404 of determining when a goal is within the space. The method can also include a step 406 of determining when computational overrun exists.

In some instances, the method includes a step 408 of selectively switching between a plurality of control schemes based on any one or more of (1) the number of objects in the space, (2) whether the goal is within the space, and/or (3) whether computational overrun exists. As noted above, the plurality of control schemes comprising a model predictive control scheme (selected for crowded situations), a simplified model predictive control scheme (selected for computational overrun), and a proportional-integral-derivative scheme. It will be understood that selectively switching between the plurality of control schemes reduces power consumption of an automated system compared to when the automated system utilizes only the model predictive control scheme and/or an automated system that utilizes the model predictive control scheme and/or the simplified model predictive control scheme, but no proportional-integral-derivative scheme.

In sum, the MPC involves the most computational overhead, the simplified MPC requires less overhead than the MPC, and the PID requires the least computational overhead of all the schemes. Conversely, the MPC utilizes the most power consumption, the simplified MPC requires less power consumption than the MPC, and the PID requires the least power consumption of all the schemes.

Implementations of the systems, apparatuses, devices, and methods disclosed herein may comprise or utilize a special purpose or general-purpose computer including computer hardware, such as, for example, one or more processors and system memory, as discussed herein. Computer-executable instructions comprise, for example, instructions and data which, when executed at a processor, cause a general-purpose computer, special purpose computer, or special purpose processing device to perform a certain function or group of functions. An implementation of the devices systems, and methods disclosed herein may communicate over a computer network. A "network" is defined as one or more data links that enable the transport of electronic data between computer systems and/or modules and/or other electronic devices.

Although the subject matter has been described in language specific to structural features and/or methodological acts, it is to be understood that the subject matter defined in the appended claims may not necessarily limited to the described features or acts described above. Rather, the described features and acts are disclosed, as example forms of implementing the claims.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Conditional language, such as, among others, can, "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps, are in any way required for one or more embodiments.

What is claimed is:

1. A method comprising:
   determining, based on output of a sensor platform, crowding of a space around an automated system, wherein the automated system comprises a battery, and wherein the crowding is determined by comparing a number of objects in the space and a narrowness of the space to a threshold;
   selecting, based on the space being crowded, a model predictive control scheme to navigate the automated system to a goal;
   determining, during navigation, real-time computational overrun by the automated system;
   selecting, based on the computational overrun to navigate the automated system to the goal, a simplified model predictive control scheme in order to ensure real-time running of the automated system;
   selecting, based on the space being open and the goal being within the space, a proportional-integral-derivative scheme;
   switching among each of the model predictive control scheme, the simplified model predictive control scheme, and the proportional-integral-derivative scheme in order to conserve energy of the battery while also achieving a predetermined desired motion performance in real-time operation; and autonomously moving the automated system to the goal with the proportional-integral-derivative scheme selected, wherein the simplified model predictive control scheme assumes a constant velocity of the automated system during trajectory prediction, and wherein the simplified model predictive control scheme is utilized to determine a discrete control space instead of a continuous control space, wherein power consumption by the automated system is reduced by switching to the simplified model predictive control scheme, and wherein the crowding is further determined by tracking legs of people at the space.

2. The method according to claim 1, further comprising obtaining output from the sensor platform, the sensor platform comprising any one or more of a laser imaging and ranging sensor or a camera.

\* \* \* \* \*